US011403138B2

(12) United States Patent
Kaveri et al.

(10) Patent No.: US 11,403,138 B2
(45) Date of Patent: Aug. 2, 2022

(54) METHOD AND ELECTRONIC DEVICE FOR HANDLING RELATIVE PRIORITY BASED SCHEDULING PROCEDURE

(71) Applicant: Samsung Electronics Co., Ltd., Suwon-si (KR)

(72) Inventors: Anup Manohar Kaveri, Bangalore (IN); Nischal Jain, Bangalore (IN); Rohit Kumar Saraf, Bangalore (IN); Samarth Varshney, Bangalore (IN); Shwetang Singh, Bangalore (IN); Vinayak Hanagandi, Bangalore (IN); Srinivasa Rao Kola, Bangalore (IN); Younjo Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 16/657,662

(22) Filed: Oct. 18, 2019

(65) Prior Publication Data
US 2020/0125405 A1 Apr. 23, 2020

(30) Foreign Application Priority Data

Oct. 18, 2018 (IN) .............................. 201841039501
Oct. 11, 2019 (IN) .............................. 201841039501

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/4418* (2013.01); *G06F 9/546* (2013.01); *G06F 11/3017* (2013.01)

(58) Field of Classification Search
CPC ...... G06F 9/4881; G06F 9/4418; G06F 9/549; G06F 11/3017
See application file for complete search history.

(56) References Cited

U.S. PATENT DOCUMENTS 7,370,326 B2    5/2008   Jones et al.
7,810,094 B1   10/2010   McClure et al.
(Continued)

FOREIGN PATENT DOCUMENTS

CN       106155730 A     11/2016
WO       2012/036954 A2   3/2012

OTHER PUBLICATIONS

Intellectual Property India, "Examination report under sections 12 & 13 of the Patents Act" dated Jul. 13, 2021, in connection with Indian Patent Application No. 201841039501, 6 pages.
(Continued)

*Primary Examiner* — Wissam Rashid

(57) ABSTRACT

A method for handling a relative priority based scheduling procedure in an electronic device. The method includes receiving at least one task, from an application, to access a first core from a plurality of cores in the electronic device. Further, the method includes determining a relative priority with at least one second core from the plurality of cores in the electronic device based on the at least one task. Further, the method includes scheduling the at least one task in the first core from the plurality of cores in the electronic device based on the relative priority.

18 Claims, 21 Drawing Sheets

(51) Int. Cl.
    *G06F 11/30*    (2006.01)
    *G06F 9/54*    (2006.01)
    *G06F 9/4401*    (2018.01)

(56) References Cited

U.S. PATENT DOCUMENTS

| | | |
|---|---|---|
| 9,032,404 B2 | 5/2015 | Kissell |
| 9,158,592 B2 | 10/2015 | Griglock et al. |
| 2006/0282836 A1 | 12/2006 | Barker |
| 2007/0094664 A1 | 4/2007 | So et al. |
| 2007/0204268 A1* | 8/2007 | Drepper ................ G06F 9/5061 |
| | | 718/102 |
| 2016/0357600 A1* | 12/2016 | Chimene ............... G06F 9/4881 |

OTHER PUBLICATIONS

International Search Report dated Feb. 11, 2020 in connection with International Patent Application No. PCT/KR2019/013755, 3 pages.
Written Opinion of the International Searching Authority dated Feb. 11, 2020 in connection with International Patent Application No. PCT/KR2019/013755, 5 pages.

\* cited by examiner

METHOD AND ELECTRONIC DEVICE FOR HANDLING RELATIVE PRIORITY BASED SCHEDULING PROCEDURE

CROSS-REFERENCE TO RELATED APPLICATIONS

This application is based on and claims priority under 35 U.S.C. § 119 to Indian Patent Application No. 201841039501 filed on Oct. 18, 2018 and India Patent Application No. 201841039501 filed on Oct. 11, 2019, in the Indian Intellectual Property Office, the disclosures of which are incorporated by reference herein in their entirety.

BACKGROUND

1. Field

The disclosure relates to a multi-core system, and more specifically related to a method and electronic device for comparative scheduling scheme for inter-core preemptive hard bounded multi-core systems.

2. Description of Related Art

Main responsibility of a real-time operating system (RTOS) 130 is to facilitate services for resource allocation, protection, task synchronization and inter task communication. Kernel implements the services using kernel services. Further, the Kernel implements scheduling schemes for time sharing tasks in a multi-threaded environment. The RTOS's 130 majorly implement scheduling schemes like priority based preemptive scheduling, time slice based scheduling, etc. With increasing processing demand, the RTOS's 130 are being extended to multi-cores 120a-120n which provide scope for parallel execution. Thus, results in increasing the overall processing capability of processors 110. Prevailing symmetric multiprocessing (SMP) RTOS systems are organized to provide multi-core scheduling for executing the tasks configured to run in hard-bounded, free to run or affinity modes.

In general, different types of multicore configurations, (e.g., asymmetric multi-processing (AMP) configurations, symmetric multi-processing (SMP) configurations, bound multi-processing (BMP) configurations, or the like) are available. In the AMP configurations, each individual functional process/task is permanently allocated to a separate core 120a or 120b and each core 120a or 120b has its own operating system. However, the operating system may be multiple copies of the same operating system or be different from the core 120a to the core 120b as shown in FIG. 1B, whereas FIG. 1A illustrates a traditional uni-core system.

In the SMP configurations, a single operating system controls the execution of the processes/tasks on all cores 120-120n and may dynamically allocate sections of processes/tasks to run in parallel on separate cores 120a-120n. In the BMP configurations, the BMP configurations extend the SMP configurations by allowing to bind any process/task to a specific core 120a-120n while using a common operating system across all cores 120-120n.

FIG. 2 illustrates the RTOS 130 and preemptive scheduling, according to the prior art. In the RTOS 130, the tasks execute in the order of their priority. If a higher priority task becomes ready to run, the RTOS 130 will preempt the lower priority tasks that may be executing. The RTOS 130 are different from a general purpose operating system (GPOS) (LINUX) in scheduling aspects. The GPOS generally execute in round robin or time shared fashion. But, the RTOS scheduling is provided based on priority. The highest priority task gets out of the system only when it suspends & lower priority tasks are preempted by higher priority task. A preemption of the lower priority tasks by high priority tasks is depicted in FIG. 3.

FIG. 4A illustrates a priority based preemptive scheme, according to the prior art. In the AMP configurations, as described above, a single OS is confined to a single core 120 resulting in scheduling schemes confided only to the core where the OS is running. In the SMP configurations/BMP configurations, operations of a single instance of the RTOS 130 is shared across multiple cores 120a-120n which results in extending of scheduling schemes across all the cores 120a-120n participating in the multi-core cluster.

As shown in FIG. 4A, Task1 has priority P10, Task2 has priority P7 & Task3 has priority P6, thus Task1 has the highest priority and is the current running task. At any given point of time, the single highest priority task is scheduled in the processor 110 (i.e., Task1>Task2>Task3).

FIG. 4B illustrates a multi core SMP mode with free to run tasks, according to the prior art. The system tasks are configures to run on any available cores. The priority based preemptive scheduling will ensure top 'n' priority tasks to be running simultaneously (parallel) in the system having 'n' cores 120a-120n. Task1, Task2 & Task3 are scheduled by the RTOS 130 as they are the top 3 highest priority tasks in the system.

FIG. 4C illustrates a multi core BMP mode with bounded tasks, according to the prior art. As shown in FIG. 4C, the system tasks are configured to run on ONLY one of the available cores 120a-120n. The priority based preemptive scheduling will ensure top priority task among the tasks configured to run on a specific core 120a or 120b or 120c is scheduled at any given point in time. The tasks running in parallel on different cores 120a or 120b or 120c have no priority relation between them. Task-C1, B1 & A1 are the highest priority tasks among the bounded tasks to the respective cores 120a or 120b or 120c.

FIG. 4D illustrates a current BMP scheduling scheme, according to the prior art. In the current BMP scheduling scheme, the multi-core RTOS schedules the top priority among the available ready tasks bounded to the CORE-A 120a. As shown in FIG. 4D, TASK-A1 has the highest priority among all the tasks bounded to the CORE-A 120a thus it's in running state. Similarly on the CORE-B 120b, TASK-B1 has the highest priority among all the ready tasks bounded to TASK-B this it's in running state. Here, TASK-B1 with priority 15, is less than a current running task (CRT) of the CORE-A 120a (i.e. TASK-A1) & the ready to run tasks of CORE-A (i.e. TASK A2, A3 & A4), still it's scheduled by the kernel as tasks bounded on both the cores 120a and 120b do not share relative priority among them & they only consider priorities of the tasks configured to the same core 120a or 120b.

SUMMARY

Thus, it is desired to address the above mentioned disadvantages or other shortcomings or at least provide a useful alternative.

An embodiment herein is to provide a method and electronic device for handling a relative priority based scheduling procedure.

Another embodiment herein is to receive at least one task, from an application, to access a first core from a plurality of cores in the electronic device.

Another embodiment herein is to determine a relative priority with at least one second core, with respect to the first core, from the plurality of cores in the electronic device based on the at least one task.

Another embodiment herein is to schedule the at least one task in the first core from the plurality of cores in the electronic device based on the relative priority.

Another embodiment herein is to provide the relative priority corresponding to the at least one task bounded to the first core from the plurality of cores configured to follow priority relation with at least one second core from the plurality of cores in the electronic device.

Accordingly, embodiments herein disclose a method for handling a relative priority based scheduling procedure in an electronic device. The method includes receiving, by the electronic device, at least one task, from an application, to run on a first core among a plurality of cores in the electronic device, wherein the at least one task is bounded to the first core. Further, the method includes determining, by the electronic device, a relative priority of the at least one task running on the first core with at least one second core among the plurality of cores in the electronic device based on the at least one task. Further, the method includes scheduling, by the electronic device, the at least one task in the first core among the plurality of cores in the electronic device based on the relative priority.

In an embodiment, the relative priority corresponds to the at least one task bounded to the first core from the plurality of cores is configured to follow priority relation with at least one second core from the plurality of cores in the electronic device.

In an embodiment, the relative priority corresponds to a special priority assigned to the at least one task bounded to the first core, which is a function of the priorities of tasks bound to the first core and the second core. The at least one task bounded to the first core from the plurality of cores is configured to follow priority relation with the at least one second core from the plurality of cores in the electronic device.

In an embodiment, the at least one task configured for the relative priority is scheduled only when the at least one second core running a task has priority equal or less than the at least one task configured for relativity.

In an embodiment, the first core is a bounded core and the at least one second core is a relative core. The bounded core refers to the core to which the task is bounded. The relative core refers to a core with respect to which relativity has been configured by the task.

In an embodiment, scheduling, by the electronic device, the at least one task based on the relative priority in the first core from the plurality of cores in the electronic device comprises determining movement of the at least one task within a relative priority ready to run data structure (RBRTds) at the first core among a ready and blocked list of tasks based on a current running task (CRT) priority at the at least one second core, determining a force suspension for the CRT at the first core registered for Relative Bounded Multi Processing (R-BMP), sending a Relative Scheduling Cross Core Signaling (RSCCS) to the first core for force suspension, and scheduling, by the electronic device, the at least one task based on the RSCCS.

In an embodiment, the first core performs the force suspension for the CRT and adds the CRT to the RBRTds, and schedules a next eligible task from a ready to run tasks data structure (BRTds), when the RSCCS is sent to the first core for the force suspension.

In an embodiment, scheduling, by the electronic device, the at least one task based on the relative priority in the first core from the plurality of cores in the electronic device includes determining movement of the at least one task within a relative priority ready to run data structure (RBRTds) at the first core among a ready and blocked list of tasks based on a current running task (CRT) priority at the at least one second core, determining for pre-emption of the CRT at the first core registered for a R-BMP, sending a RSCCS to the first core for a force pre-emption, and scheduling, by the electronic device, the at least one task based on the RSCCS.

In an embodiment, a next top priority task from the RBRTds preempts the CRT upon reception of RSCCS for the forced preemption on the first core. The first core schedules the next top priority task from the RBRTds when the RSCCS is sent to the first core for the force pre-emption.

Accordingly, embodiments herein disclose an electronic device for handling a relative priority based scheduling procedure. The electronic device includes a processor coupled with a memory. The processor is configured to receive at least one task, from an application, to run on a first core among a plurality of cores in the electronic device. Further, the processor is configured to determine a relative priority with of the at least one task running on the first core 120a with at least one second core among the plurality of cores in the electronic device based on the at least one task. Further, the processor is configured to schedule the at least one task based on the relative priority in the first core among the plurality of cores in the electronic device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
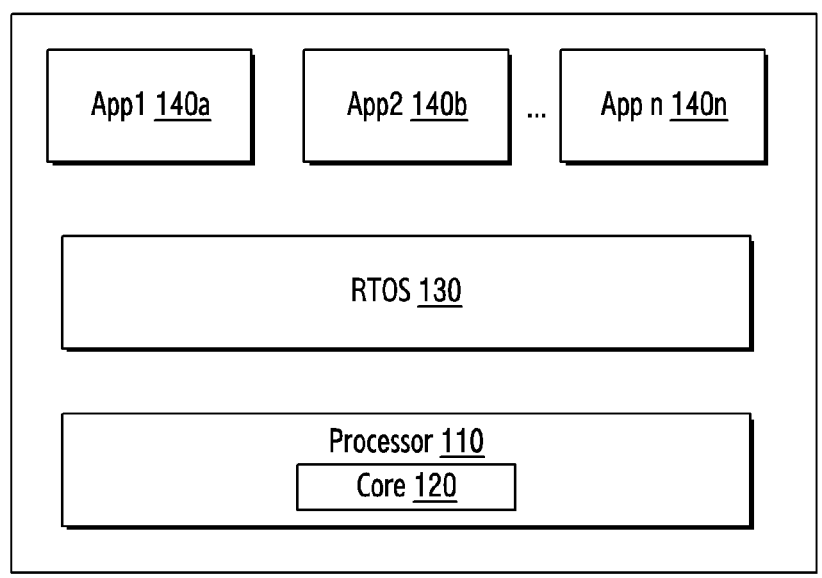
FIG. 1A illustrates a traditional uni-core system, according to the prior art.
Figure 1B:
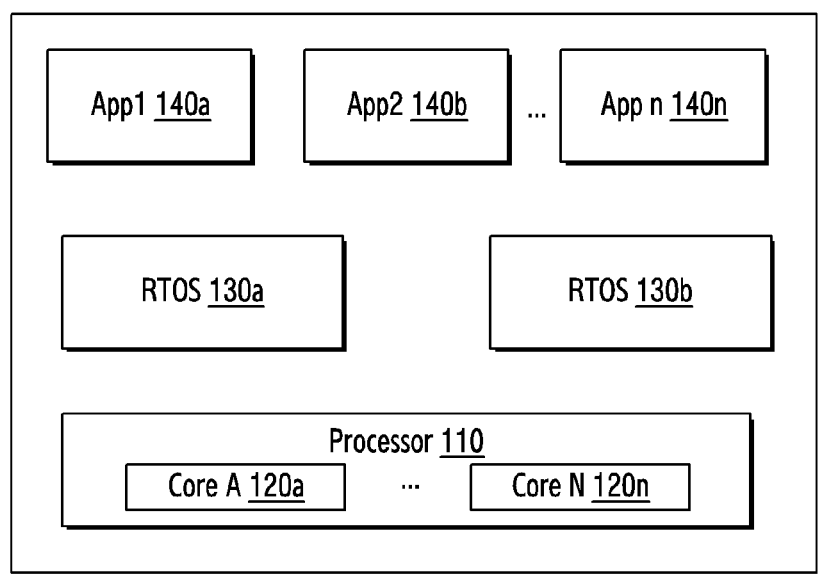
FIG. 1B illustrates an AMP system, according to the prior art.
Figure 2:
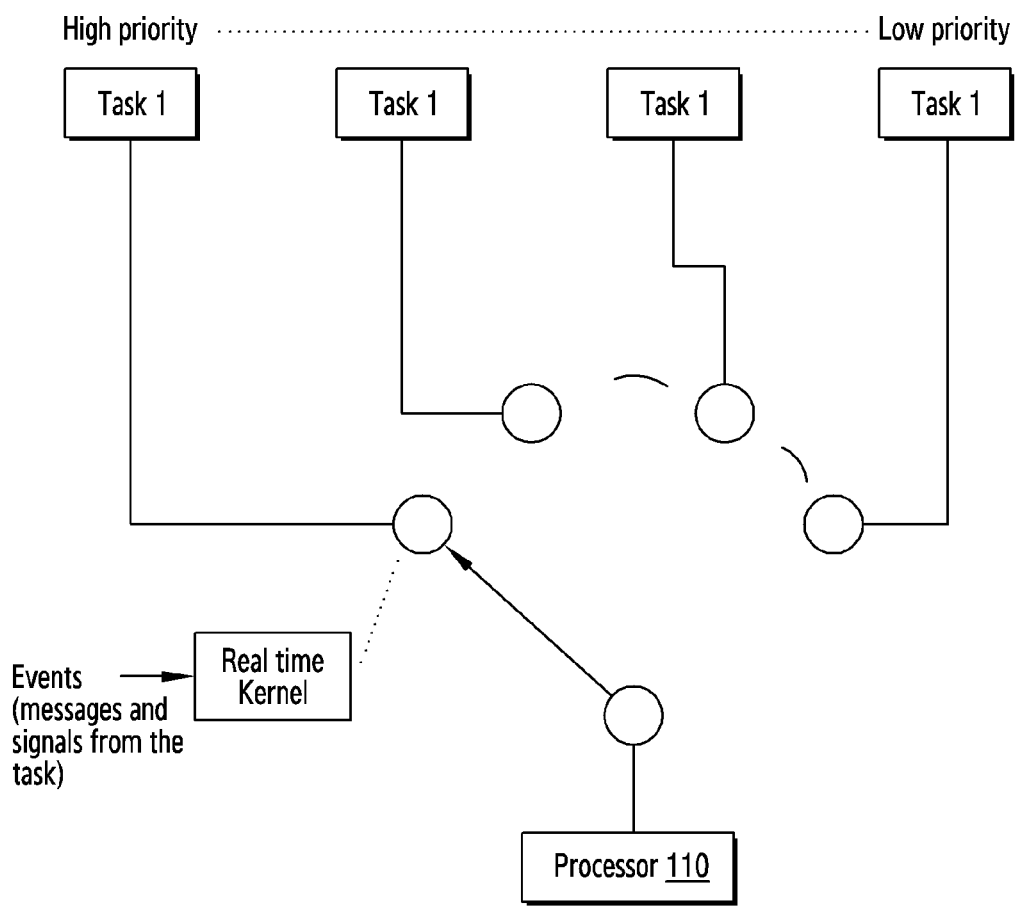
FIG. 2 illustrates a RTOS and preemptive scheduling, according to the prior art.
Figure 3:
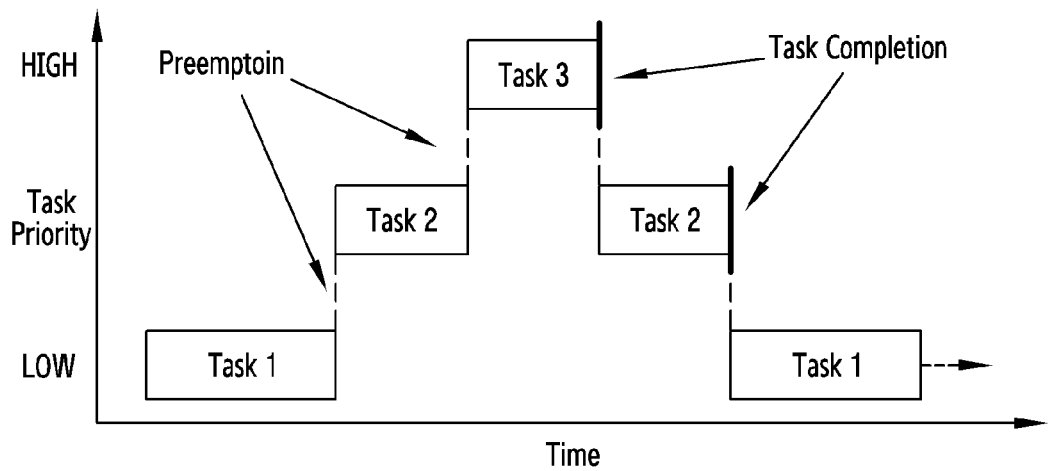
FIG. 3 illustrates a preemption of lower priority tasks by high priority tasks, according to the prior art.
Figure 4A:
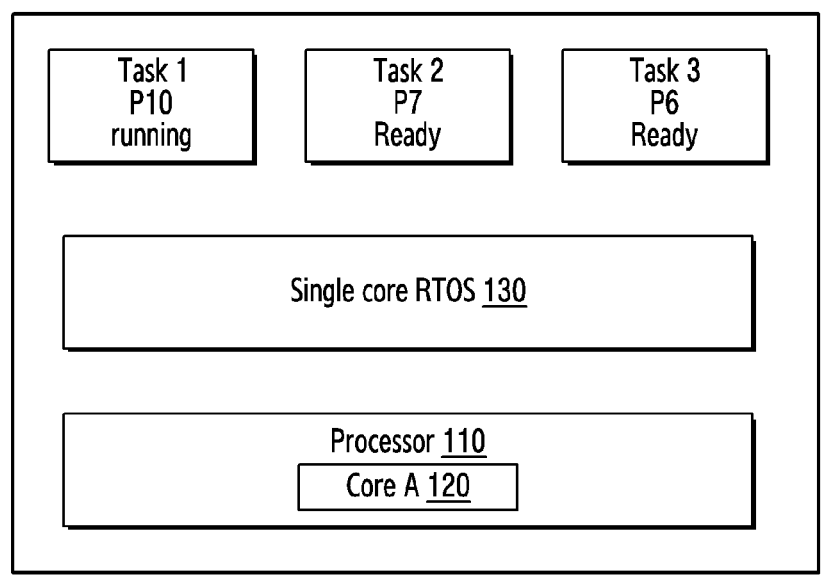
FIG. 4A illustrates a priority based preemptive scheme, according to the prior art.
Figure 4B:
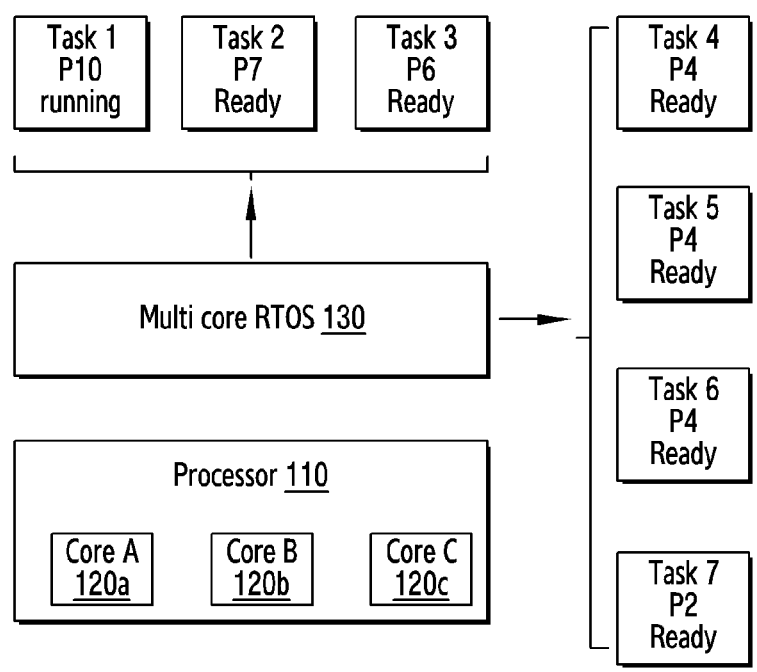
FIG. 4B illustrates a multi core SMP mode with free to run tasks, according to the prior art.
Figure 4C:
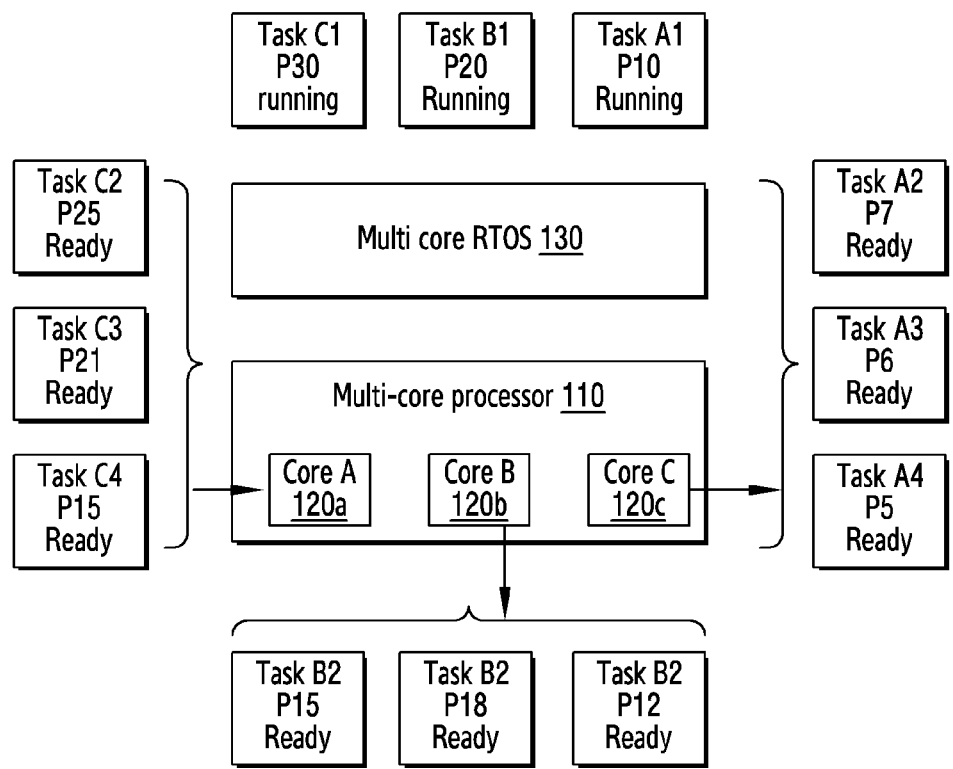
FIG. 4C illustrates a multi core BMP mode with bounded tasks, according to the prior art.
Figure 4D:
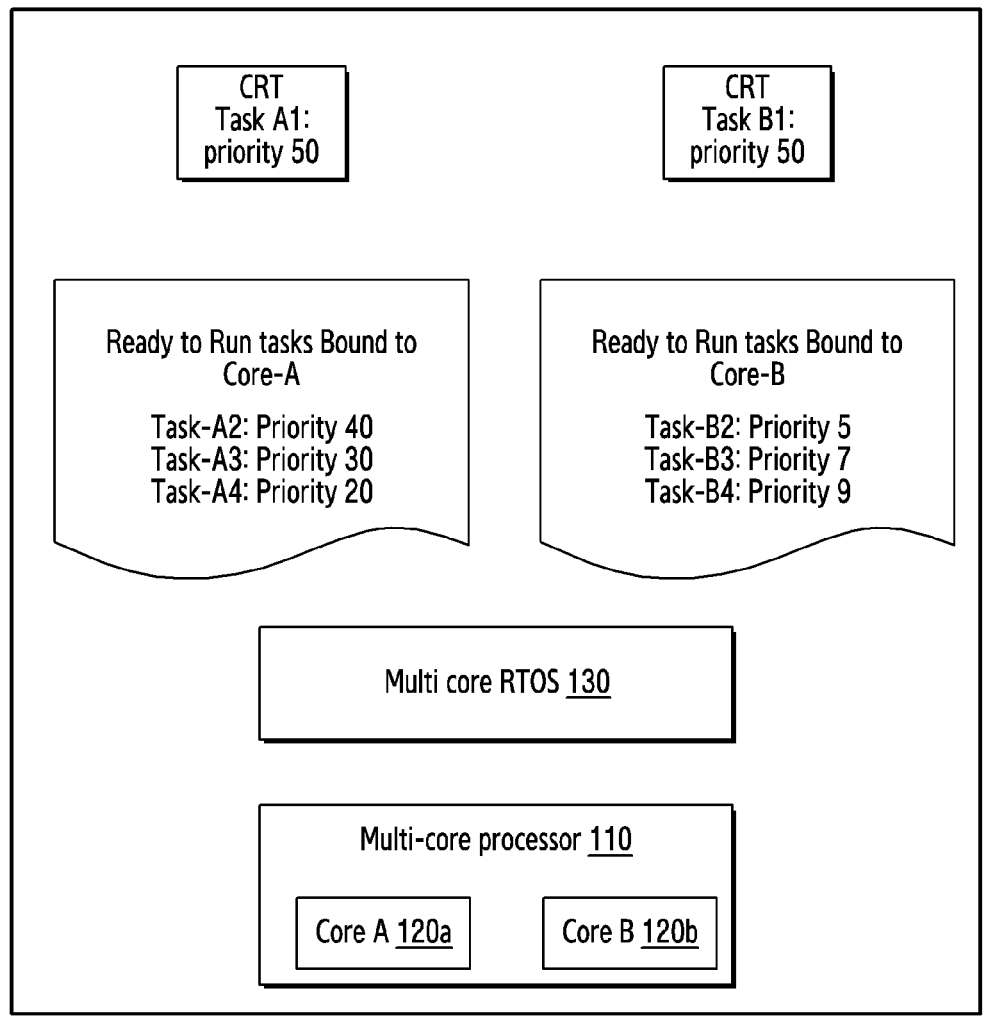
FIG. 4D illustrates a current BMP scheduling scheme, according to the prior art.

FIGS. 1A through 10D, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for handling a relative priority based scheduling procedure in an electronic device. The method includes receiving, by the electronic device, at least one task, from an application, to run on a first core among a plurality of cores in the electronic device, wherein the at least one task is bounded to the first core. Further, the method includes determining, by the electronic device, a relative priority of at least one task running on the first core 120*a* with at least one second core among the plurality of cores in the electronic device based on the at least one task. Further, the method includes scheduling, by the electronic device, the at least one task based on the relative priority in the first core among the plurality of cores in the electronic device.

Unlike conventional methods and systems, in the proposed method, the relative priority with respect to a core can be maintained for selected tasks running on other cores (outside a hard-bounded core selected). In the proposed method, the task can be configured to establish the relative priority with a different core or core's other than the core where it's bounded (i.e. configured to execute). Thus results in enhancing memory utilization in the electronic device. The proposed method can be used to provide a comparative scheduling scheme for inter-core preemptive hard bounded multi-core systems based on the relative priority with respect to that core that can be maintained for selected tasks running on other cores. The comparative scheduling system provides real-time preemptive scheduling scheme for multi-core system so as to facilitate a SMP environment. Prevailing systems are organized to provide multi-core scheduling for execution contexts configured to run in hard-bounded, free to run or affinity modes.

The proposed method can be used to eliminate a cache thrashing that can reduce performance in the SMP system by allowing applications that share the same data set to run exclusively on a same processor based on the relative priority with respect to that core that can be maintained for selected tasks running on other cores. The proposed method offers simpler application debugging than SMP since all execution threads within an application run on a single processor. The proposed method can be used to assist legacy applications that use poor techniques for synchronizing shared data to run correctly. As no task migration is applicable for BMP systems, a kernel processing overhead is greatly reduced.

The proposed method can be used in a various fields (e.g., RTOS, symmetric multicore processing in the RTOS, an inter process communication (for handling message queues, events or the like), a modem, a health care system, a fleet management system, an automotive system, an Internet of thing (IoT) device, or the like.

The proposed method deals with the implementation of priority based preemptive scheme for multi-core processing in a BMP mode which is the most commonly used mode used for time critical embedded systems. The proposed method can be used to provide a scheduling scheme which is applicable to BMP mode of multicore processing.

Referring now to the drawings, and more particularly to FIG. 5A-FIG. 6 and FIG. 7C-FIG. 10D, there are shown preferred embodiments.

Figure 5A:
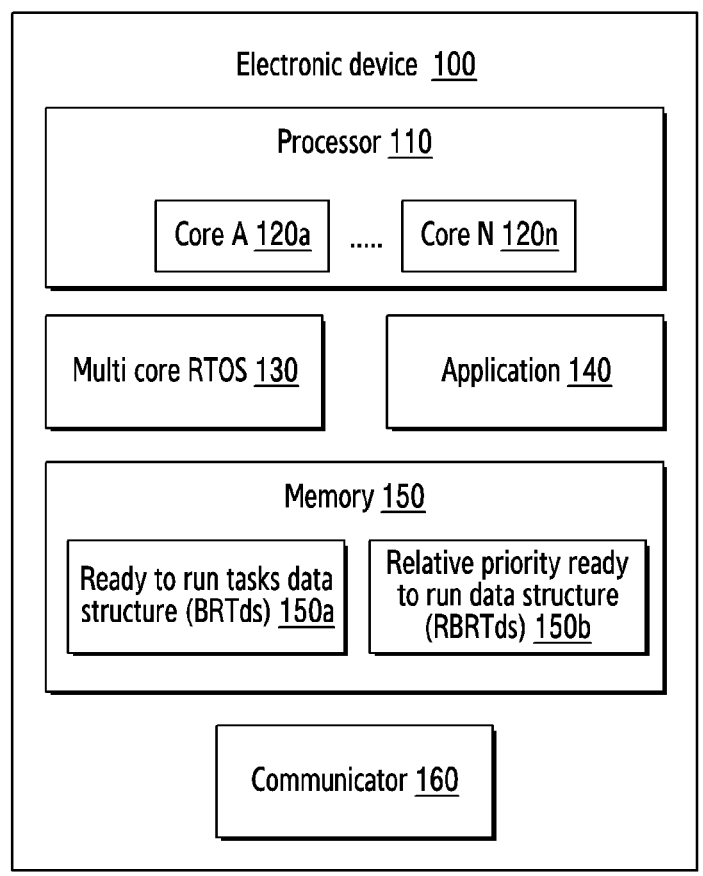
FIG. 5A illustrates an electronic device for handling a relative priority based scheduling procedure, according to an embodiment as disclosed herein.

FIG. 5A illustrates an electronic device 100 for handling a relative priority based scheduling procedure, according to an embodiment as disclosed herein. The electronic device 100 can be, for example, but not limited to a smart phone, a laptop, a desktop, a server, a smart watch, a personal digital assistant (PDA), a global positioning system, a multimedia device, a video device, an internet of things (IoT) device, a game console, or the like. In an embodiment, the electronic device 100 includes a processor 110 having a plurality of cores 120*a*-120*n*, a multi core RTOS 130, an application 140, a memory 150 having a ready to run tasks data structure (BRTds) 150*a* and a relative priority ready to run data structure (RBRTds) 150*b*, and a communicator 160. The processor 110 is coupled with the multi core RTOS 130, the application 140, the memory 150 and the communicator 160. The application 140 can be, for example, but not limited to a game application, a finance application or the like. The BRTds 150*a* is a queue like data structure for holding normal ready to run tasks.

In an embodiment, the processor 110 is configured to receive at least one task, from the application 140, to run on a first core 120*a* from a plurality of cores 120*a*-120*n*. Based on the at least one task, the processor 110 is configured to determine a relative priority with at least one second core 120*b*, with respect to the first core 120*a*, from the plurality of cores 120*a*-120*n*. At the time of task creation, a task control block will have the list of cores it wants to establish relativity with. Based on the relative priority, further, the processor 110 is configured to schedule the at least one task in the first core 120*a* from the plurality of cores 120*a*-120*n*.

In an embodiment, the relative priority corresponds to the at least one task bounded to the first core 120*a* from the plurality of cores 120*a*-120*n* is configured to follow priority relation with at least one second core 120*b* from the plurality of cores 120*a*-120*n*. In an embodiment, the first core 120*a* is a bounded core and the at least one second core 120*b* is a relative core. The bounded core refers to a core to which the task is bounded. The relative core refers to a core with respect to which relativity has been configured by the task.

In an embodiment, the relative priority corresponds to a special priority assigned to at least one task bounded to the first core 120*a*, which is a function of the priorities of tasks bound to the first core 120*a* and the second core. The at least one task bounded to the first core 120*a* from the plurality of cores 120*a*-120*n* is configured to follow priority relation with the at least one second core from the plurality of cores 120*a*-120*n* in the electronic device 100.

In an embodiment, the at least one task configured for the relative priority is scheduled only when the at least one second core 120*b* running a task has priority equal or less than the at least one task configured for relativity.

In an embodiment, the processor 110 is configured to determine movement of the at least one task within a relative priority ready to run data structure (RBRTds) 150*b* at the first core 120*a* among a ready and blocked list of tasks based on a current running task (CRT) priority at the at least one second core 120*b*. Further, the processor 110 is configured to determine a force suspension for the CRT at the first core 120*a* registered for Relative Bounded Multi Processing (R-BMP) and send a signaling message (e.g., Relative Scheduling Cross Core Signaling (RSCCS) or the like) to the first core 120*a* for force suspension. Based on the signaling message, the processor 110 is configured to schedule the at least one task.

In an embodiment, the first core 120*a* performs the force suspension the CRT and adds the CRT to the RBRTds 150*b*, and schedules a next eligible task from a ready to run tasks data structure (BRTds) 150*a*, when the signaling message is sent to the first core 120*a* for the force suspension.

In an embodiment, the processor 110 is configured to determine movement of the at least one task within a relative priority ready to run data structure (RBRTds) 150*b* at the first core 120*a* among a ready and blocked list of tasks based on the CRT priority at the at least one second core 120*b*. Further, the processor 110 is configured to determine for pre-emption of the CRT at the first core 120*a* registered for the R-BMP and send the signaling message to the first core 120*a* for a force pre-emption. Based on the signaling message, the processor 110 is configured to schedule the at least one task.

In an embodiment, a next top priority task from the RBRTds preempts the CRT upon reception of RSCCS for the forced preemption on the first core. The first core 120*a* schedules the next top priority task from the RBRTds 150*b* when the signaling message is sent to the first core 120*a* for the force pre-emption.

In an embodiment, the processor 110 is configured to assign a priority to each of a plurality of tasks bound to the first core 120*a* and assign a priority to each of a plurality of tasks bound to the second core 120*b*. Further, the processor 110 is configured to determine at least one special task bound to the second core 120*b* having a relation with the first core 120*a* and assign a special priority to the special task which is a function of the priorities of tasks bound to the first core 120*a* and the second core 120*b* and schedule the special task for execution on the second core 120*b* when the priority of the task running on the first core 120*a* is equal to or less than the priority of the special task.

In an embodiment, scheduling the special task for execution task includes detecting a pre-emption of a current running task on the first core 120*a* and performing a force suspension of a current running task on the second core 120*b*.

The memory 150 comprising a data structure stores and computes the highest priority ready to run task among all the ready bounded tasks at the core 120*a*-120*n*. The data structure stores and computes the highest priority ready to run task among all the ready relative bounded tasks at a core. The data structure segregates relative tasks into ready to run & blocked sections, where the blocked sections will contain range of relative tasks not eligible to run on the bounded core due to relative priority.

In an embodiment, the processor 110 rearranges sections of relative tasks data structure into range of ready to run & blocked tasks based on the priority range of the current running task at the relative core. Further, the processor 110 identifies preemption of the current running task on the relative core, determines force suspension of current running task at bounded core, and initiates the cross core signaling.

In another embodiment, the processor 110 identifies suspension of the current running task on the relative core, determines preemption of the current running task at the bounded core and initiates cross core signaling.

Figure 7A:
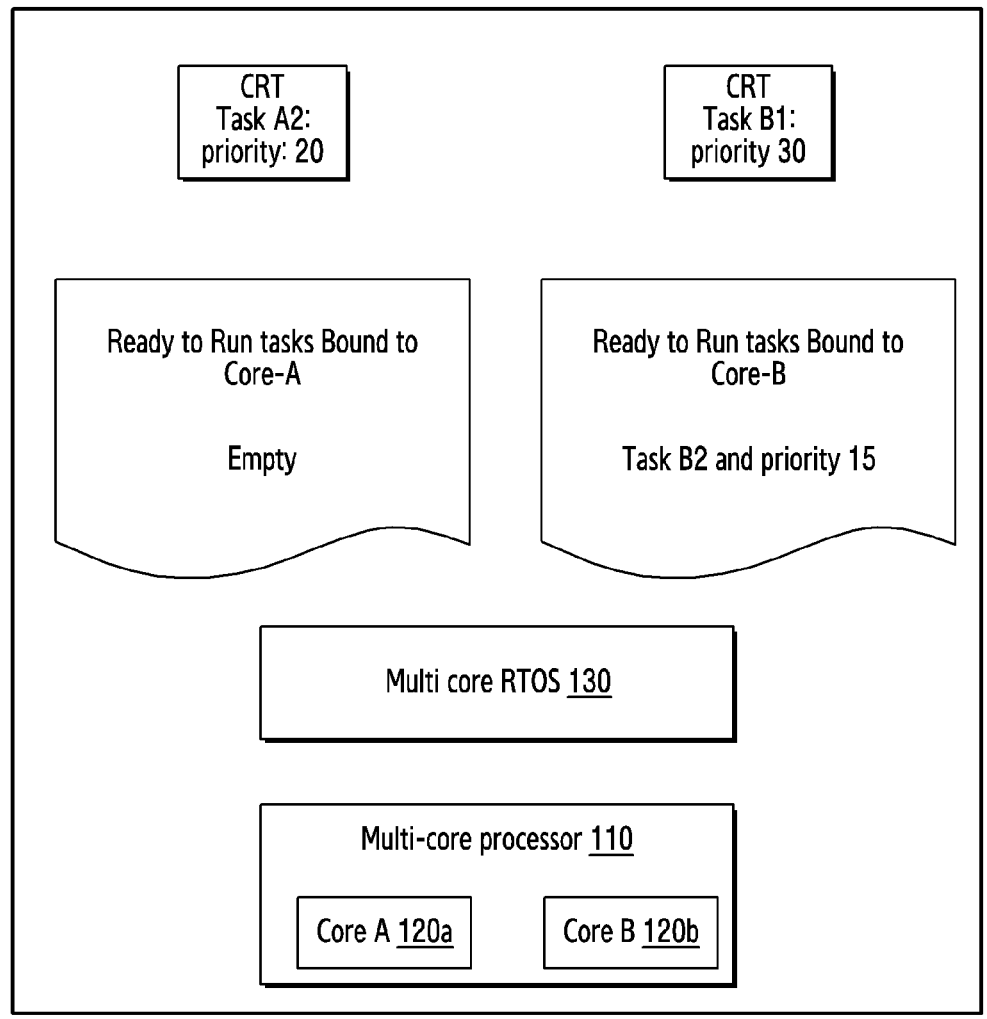
FIG. 7A and FIG. 7B illustrate existing BMP system scheduling schemes, according to the prior art.
Figure 7B:
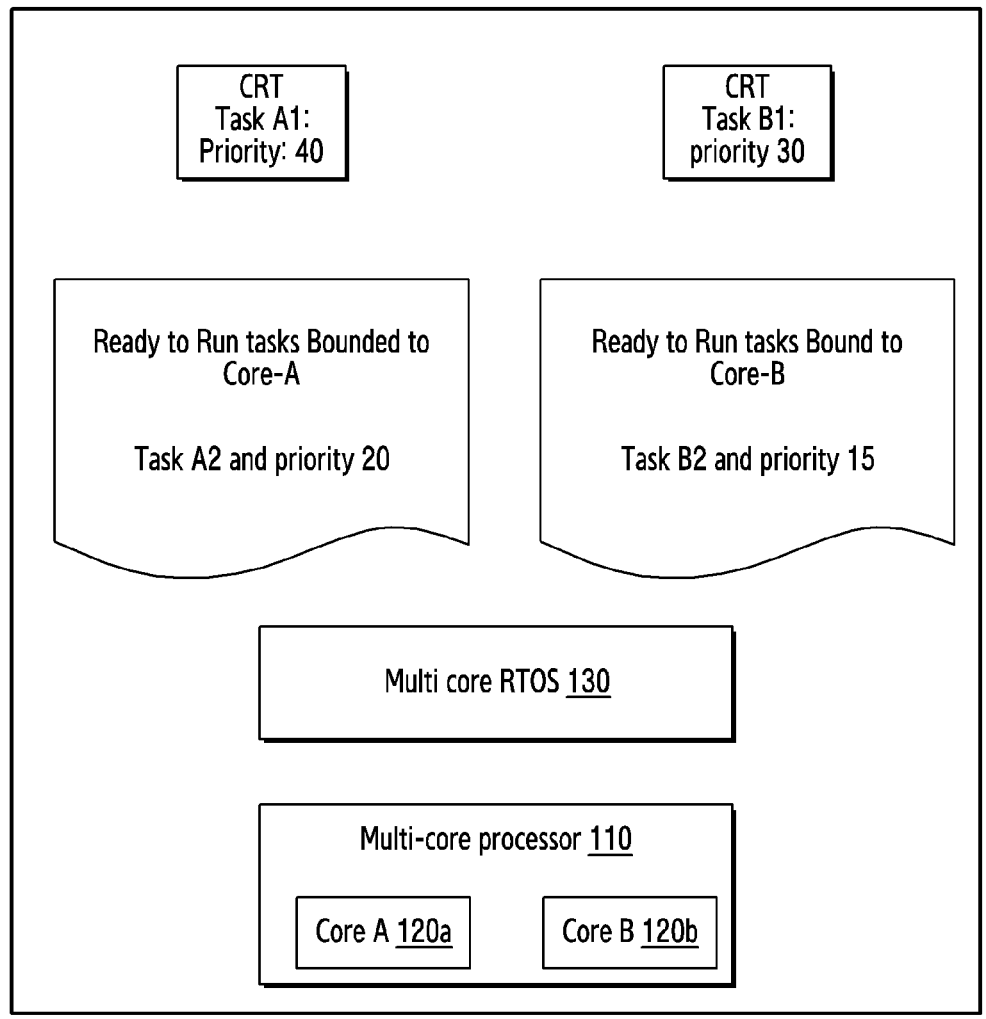

In the proposed methods, during a multicore BMP mode of RTOS scheduling, where the tasks bounded to certain core can be configured to follow priority relation with other core or cores. Consider the below example (as shown in FIG. 7A and FIG. 7B) which illustrates the difference between the existing method & the proposed methods.

I. No of cores participating in BMP: 2 cores (Core A & Core B)
II. Higher the number, higher the priority of the task (i.e. 20 priority is higher than 10 priority)
III. Core A 120*a* has 2 tasks bounded to be schedule only on it & similarly Core B 120*b* also has 2 tasks bounded to be scheduled only on the core B 120*b*.
Tasks on Core A 120*a*
  Task A1—Priority 40
  Task A2—Priority 20
Tasks on Core B 120*b*
  Task B1—Priority 30
  Task B2—Priority 15

Based on the existing systems, scenario 1, Task A2-P20 is running on the Core-A 120*a* & Task B1—P30 is running on the Core-B 120*a*. In scenario 2, consider Task A1-Priority 40 gets activated by an ISR and is scheduled on the Core-A 120*a*. In the example, both Task-A1 & Task-B1 keep running in parallel on different cores, as in the current systems Task-B1 bounded to the Core-B 120*b* & Task-A1 is bounded to the Core-A do not share any priority relation. Let's consider a design requirement which requires Task-B1 (Priority 30) to be related to priority of tasks scheduled at the Core-A 120*a*. (i.e., Task-B1 cannot be running when a higher priority task is running at the Core-A). This requirement cannot be fulfilled with the current BMP scheduling scheme.

With the proposed scheme the below conditions are satisfied:
  I. A specific task can be configured to have a priority relation with the other cores 120*a*-120*n*,
  II. Task configured for relative priority can be scheduled only when the related core's running a task has priority equal or less than the task configured for relativity. (i.e. in the example below Task-B1 should be running only when the Core-A 120*a* has tasks running with priorities equal or less than '30')

Figure 7C:
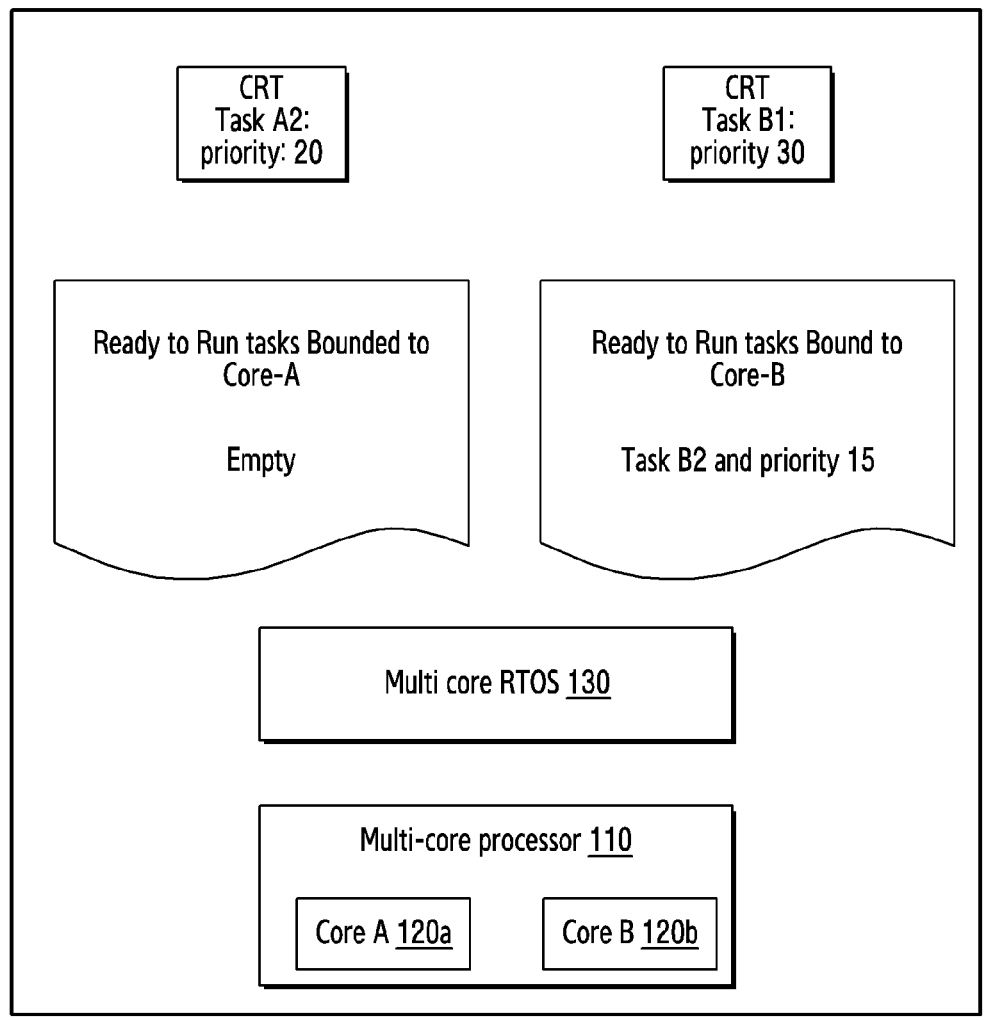
FIG. 7C and FIG. 7D illustrate proposed relative-BMP system scheduling schemes, according to an embodiment as disclosed herein.
Figure 7D:
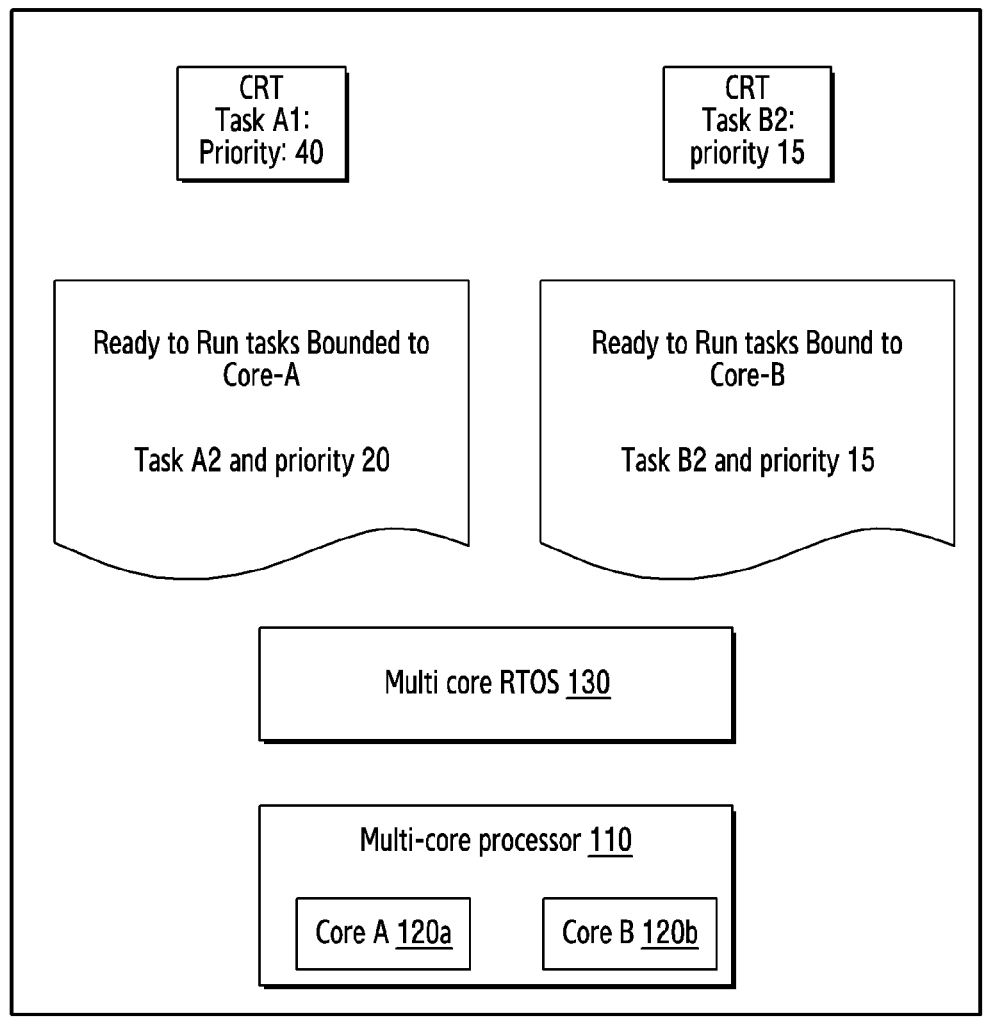

In an embodiment, as shown in FIG. 7C and FIG. 7D, scenario 1, Task A2-P20 is running on the Core-A 120*a* & Task B1-P30 is running on the Core-B 120*b* where Task-B1 is configured to have relativity to the Core-A 120*a*. In scenario 2, consider Task A1-Priority 40 gets activated by the ISR and is scheduled on the Core-A 120*a*. In the example, on the TASK-A1 being scheduled on the Core-A 120*a*, TASK-B1 at Core-B 120*b* gets forcefully suspended & TASK-B2 with a lower priority compared to the CRT at Core-A 120*a* gets scheduled & running.

In another way, as shown in FIG. 7C, Tasks A2 (Priority—20) is bounded to the Core-A 120*a*, whereas the tasks B1 (Priority—30), B2 (Priority—15) are bounded to the Core-B 120*b*. On CORE—B 120*b*, the TASK-B1 has the highest priority among all the ready tasks bounded to TASK-B thus it is in running state. In this example, TASK-B1 is a special task, which has configured relativity with respect to the Core-A 120*a* (i.e. TASK-B1 can run only if task running on the Core-A 120*a* has a lower priority than that of the TASK-B1.

As shown in FIG. 7D, now suppose, TASK-A1 (Priority—40) which is bounded to the Core-A 120*a* comes into the picture. Since it is of higher priority when compared to the Current Running Task on the Core-A 120*a*, it starts executing on the Core-A 120*a*. As a result TASK-B1, a special task which was running on the CORE-B 120*b* is forced to suspend itself (because it has registered for relativity with respect to the Core-A 120*a*) and TASK-B2 starts executing on the Core-B 120*b*.

Figure 8:
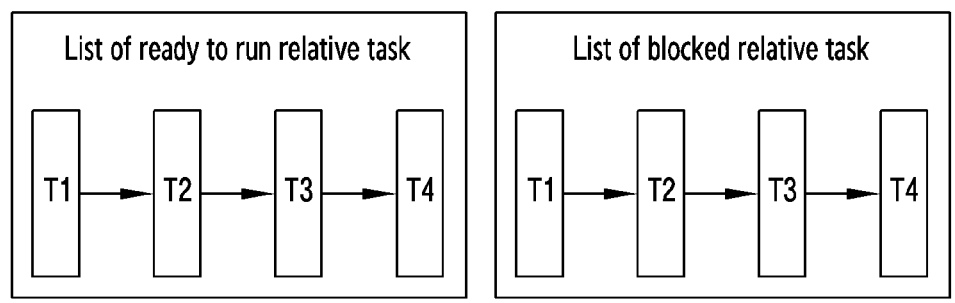
FIG. 8 illustrate an example in which RBRTds are depicted, according to an embodiment as disclosed herein.

Force suspension of TASK-B1 at the Core-B 120*b*, inverses the priority scheme at the Core-B 120*b* which can be further customized by the user with below options:
  I. Stalling the bounded core (BC) till the suspension is resumed back at the relative Task-B1,
  II. Selectively allowing other non-impacting ready tasks to be scheduled, and
  III. Designing relative task to have no impact on the inverse priority scheduling at the BC The RBRTds (150*d*) is depicted in FIG. 8. Every core 120*a*-120*n* is provided with its ready to run tasks data structure (BRTds) 150*a* and additionally the relative priority ready to run data structure (RBRTds) (150*d*). The relative bounded ready tasks data structure is a data structure which internally manages to segregate relative tasks which are ready to run & relative tasks which are blocked due to relative priority at the RC at any given point in time API's providing access to RBRTds 150*b*/BRTds 150*a* can perform operations like:
  I. Accessing the highest priority task among the list of ready to Run relative task in the RBRTds 150*b*,
  II. Movement of specific tasks across the ready & blocked lists in the RBRTds 150*b*.
  III. Adding and removing tasks from both RBRTds & BRTds The processor 110 is configured to execute instructions stored in the memory 150 and to perform various processes. The communicator 160 is configured for communicating internally between internal hardware components and with external devices via one or more networks. The memory 150 stores instructions to be executed by the processor 110.

Although FIG. 5A shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the invention. One or more components can be combined together to perform same or substantially similar function to handle the relative priority based scheduling procedure in the electronic device 100.

Figure 5B:
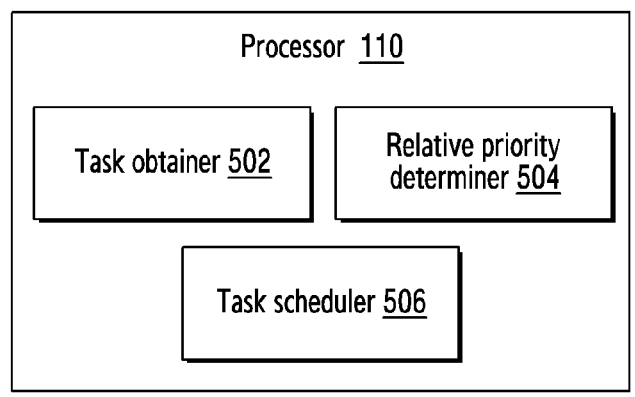
FIG. 5B illustrates various hardware blocks of a processor included in the electronic device, according to an embodiment as disclosed herein.

FIG. 5B illustrates various hardware blocks of the processor 110 included in the electronic device 100, according to an embodiment as disclosed herein. In an embodiment, the processor 110 includes a task obtainer 502, a relative priority determiner 504, and a task scheduler 506.

The task obtainer 502 is configured to receive the at least one task, from the application 140, to access the first core 120*a* from the plurality of cores 120*a*-120*n* in the electronic device 100. Based on the at least one task, the relative priority determiner 504 is configured to determine the relative priority with at least one second core from the plurality of cores 120*a*-120*n* in the electronic device 100. Based on the relative priority, the task scheduler 506 is configured to schedule the at least one task in the first core 120*a* from the plurality of cores 120*a*-120*n* in the electronic device 100.

Although FIG. 5B shows various hardware components of the processor 110 but it is to be understood that other embodiments are not limited thereon. In other embodiments, the processor 110 may include less or more number of components. Further, the labels or names of the components are used only for illustrative purpose and does not limit the scope of the invention. One or more components can be combined together to perform same or substantially similar function to handle the relative priority based scheduling procedure in the electronic device 100.

Figure 6:
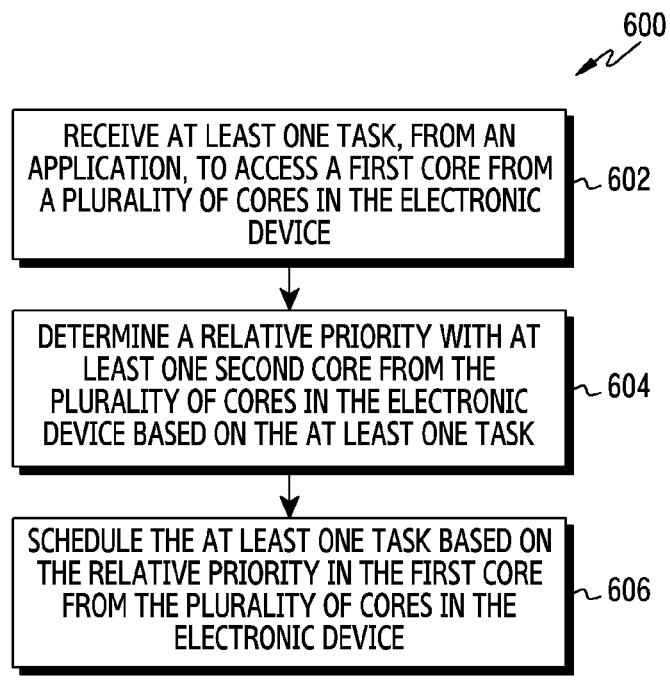
FIG. 6 illustrates flow diagram of a method for handling the relative priority based scheduling procedure in the electronic device, according to an embodiment as disclosed herein.

FIG. 6 illustrates a flow diagram 600 of a method for handling the relative priority based scheduling procedure in the electronic device, according to an embodiment as disclosed herein. The operations 602-606 are performed by the processor 110.

At 602, the method includes receiving the at least one task, from the application 140, to run on the first core 120*a* from the plurality of cores 120*a*-120*n* in the electronic device 100. At 604, the method includes determining the relative priority of at least one task running on the first core 120*a* with at least one second core among the plurality of cores 120*a*-120*n* in the electronic device 100 based on the at least one task. At 606, the method includes scheduling the at least one task in the first core 120*a* from the plurality of cores 120*a*-120*n* in the electronic device 100 based on the relative priority.

Figure 9:
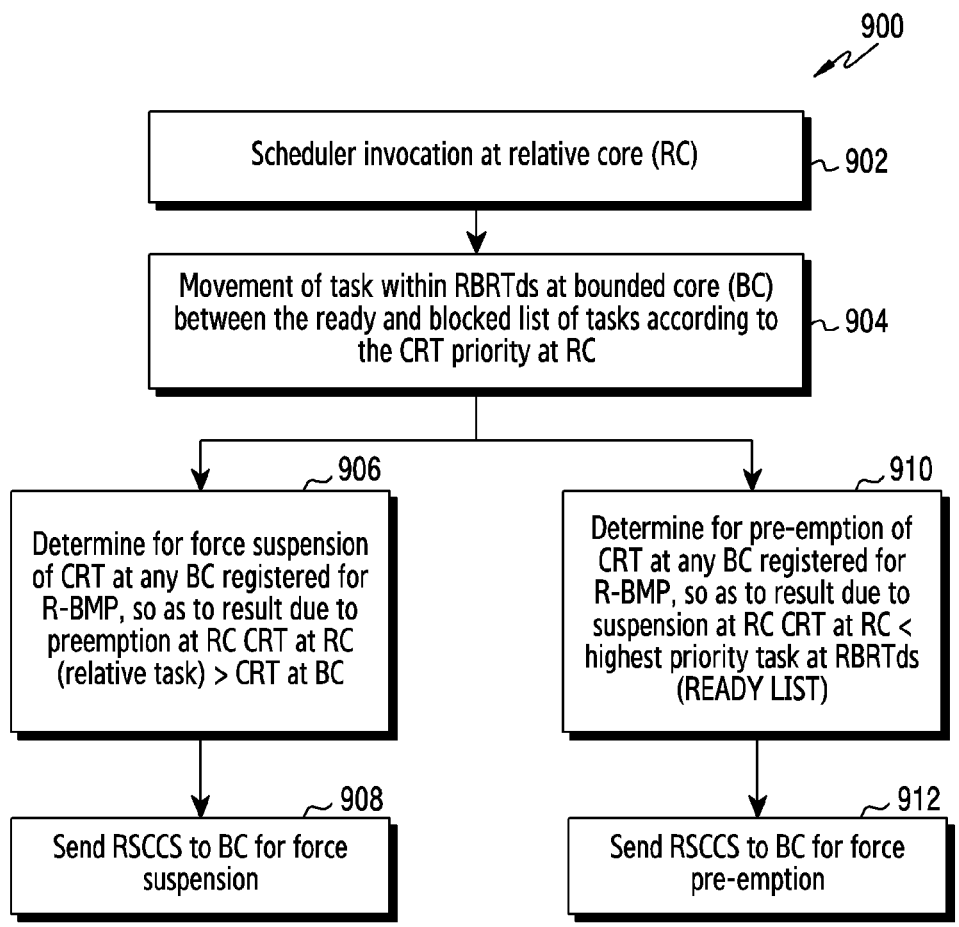
FIG. 9 illustrate an example flow diagram of a method for scheduler invocation at a relative core (RC), according to an embodiment as disclosed herein.

FIG. 9 illustrates an example flow diagram 900 of a method for scheduler invocation at the relative core (RC), according to an embodiment as disclosed herein. The operation 902-912 are performed by the processor 110.

At 902, the method includes performing scheduler invocation at the RC. At 904, the method includes determining movement of the task within RBRTds 150*a* at the BC among the ready and blocked list of tasks according to the CRT priority at the RC. At 906, the method includes determining for force suspension of CRT at any BC registered for R-BMP, so as to result due to preemption at RC CRT at RC (relative task)>CRT at BC. At 908, the method includes sending the RSCCS to the BC for force suspension. At 910, the method includes determining for pre-emption of CRT at any BC registered for R-BMP, so as to result due to suspension at RC CRT at RC< highest priority task at RBRTds (READY LIST). At 912, the method includes sending the RSCCS to BC for force pre-emption.

In an example, as shown in FIG. 7C, initially tasks A2 (20), B1 (30) are running on the Core-A 120*a* (RC), Core-B 120*b* (BC) respectively. B1 is a special task which is configured to have relativity with respect to the Core-A 120*a* i.e. B1 can run only if task running on the Core-A 120*a* i.e. RC has a lower priority than that of B1. There is another special task B3 of priority 25 waiting in RBRTDs→ready list. One normal ready to run task B2 having priority is present in BRTds of Core-B 120*b*.

Suppose task A1 having priority 40 is added to the Core A 120*a*. Scheduler invocation at Core-A 120*a* will take place. The task having priority 25 will be moved from RBRTds→Ready to RBRTds→Blocked, as its priority is less than 40. Since priority of CRT at the RC i.e. 40>CRT at BC i.e. 30, therefore forced suspension needs to happen on Core BC. RSCCS for forced suspension will be sent to BC i.e. Core-B.

Scheduler invocation on Core-B upon reception of RSCCS. The RSCCS is received for forced suspension, so that the CRT i.e. TASK-B1 having priority 30 will be added to RBRTDs→Blocked list, and normal TASK-B2 having priority 15 will be scheduled on Core-B 120*b*.

Now suppose task A1 moves out of context by suspending itself on some IPC object. This will result into scheduler invocation at the Core-A 120*a*. The scheduler will be invoked on Core-A 120*a*. Tasks B1(30), B3(25) will be moved from RBRTds→Blocked list to RBRTds→Ready list, as now their priority becomes greater than CRT at RC i.e. 20.

Pre-emption needs to happen at BC, because task B1's priority is greater than that of CRT at BC i.e. 15. RSCCS for pre-emption will be sent to BC i.e. Core-B. Scheduler will be invoked at Core-B upon reception of RSCCS. RSCCS was received for forced suspension. Pre-empt Task B2(15) and schedule Task B1(30) i.e. highest priority task in RBRTds→Ready List.

FIG. 10A-FIG. 10D illustrate example flow diagrams 1000*a*-100*d* of a method for scheduler invocation at the BC, according to an embodiment as disclosed herein.

Figure 10A:
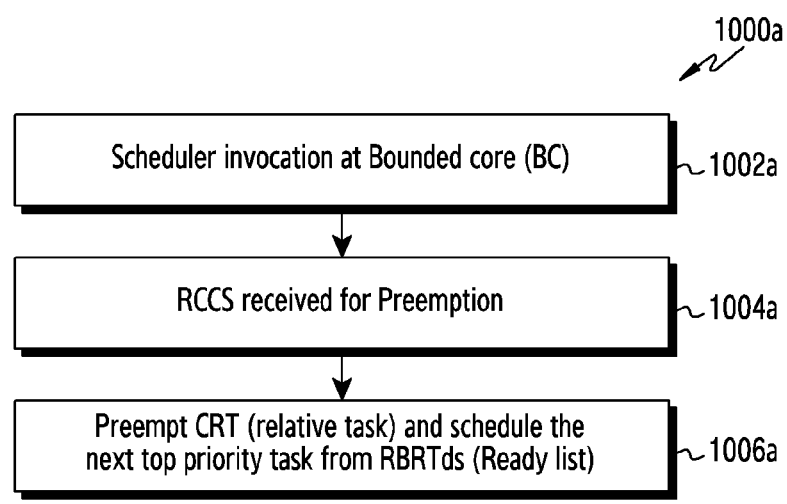
FIG. 10A-FIG. 10D illustrate example flow diagrams of a method for scheduler invocation at a bounded core (BC), according to an embodiment as disclosed herein.

As shown in FIG. 10A, at 1002*a*, the method includes scheduler invocation at the BC. At 1004*a*, the method includes receiving the RCCS for preemption. At 1006*a*, the method includes preempting the CRT (relative task) and scheduling the next top priority task from RBRTds (Ready list).

Figure 10B:
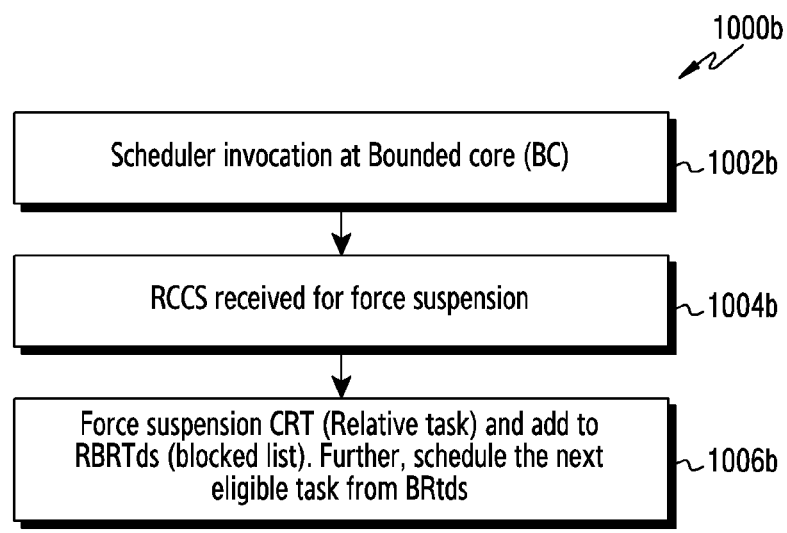

As shown in FIG. 10B, at 1002*b*, the method includes Scheduler invocation at the bounded core (BC). At 1004*b*, the method includes receiving the RCCS for force suspension. At 1006*b*, the method includes Force suspension CRT (Relative task) and add to RBRTds (blocked list). Further, schedule the next eligible task from the BRTds 150*a*.

Figure 10C:
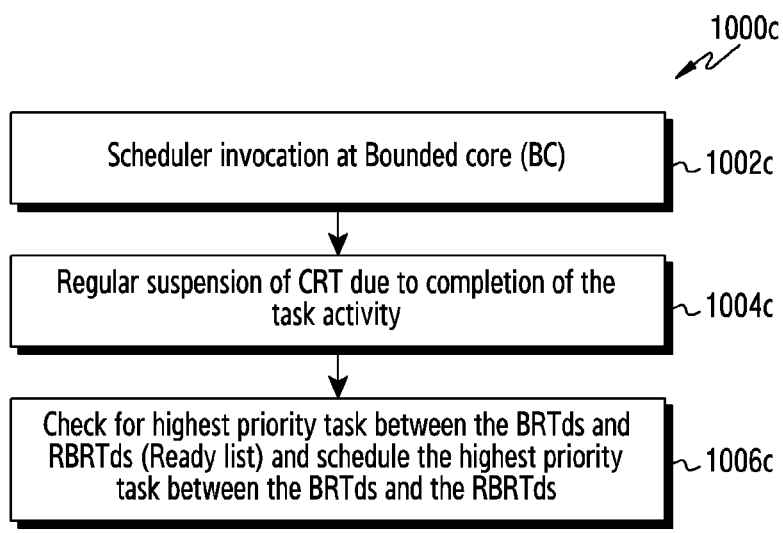

As shown in FIG. 10C, at 1002*c*, the method includes scheduler invocation at the BC. At 1004*c*, the method includes performing the regular suspension of CRT due to completion of the task activity. At 1006*c*, the method includes determining the highest priority task between the BRTds 150*a* and the RBRTds 150*b* (Ready list) and scheduling the highest priority task between the BRTds 150*a* and the RBRTds 150*b*

Figure 10D:
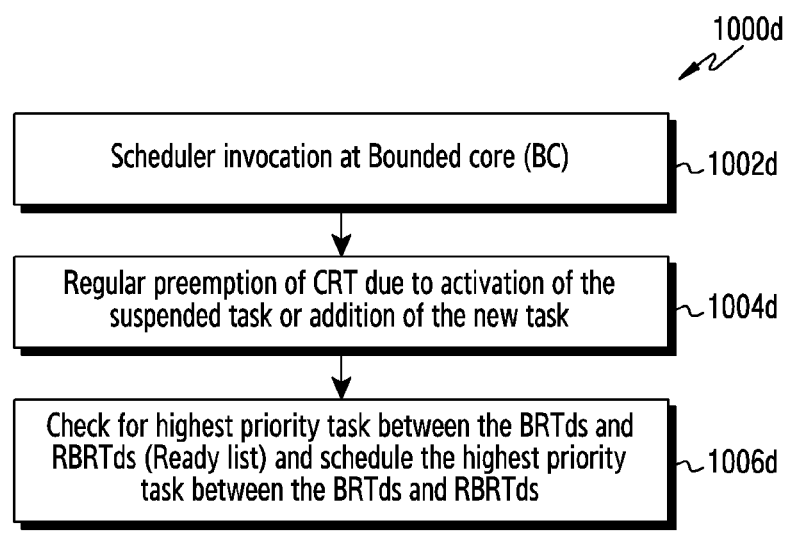

As shown in FIG. 10D, at 1002*d*, the method includes Scheduler invocation at the BC. At 1004*d*, the method includes providing regular preemption of CRT due to activation of the suspended task or addition of the new task. At 1006*d*, the method includes determining for highest priority task between the BRTds 150*a* and RBRTds 150*b* (Ready list) and scheduling the highest priority task between the BRTds 150*a* and the RBRTds 150*b*.

The various actions, acts, blocks, steps, or the like in the flow diagrams 600, 900, and (1000*a*-1000*d*) may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the disclosure has been described with various embodiments, various changes and modifications may be suggested to one skilled in the art. It is intended that the disclosure encompass such changes and modifications as fall within the scope of the appended claims

What is claimed is:

1. A method for operating an electronic device including a plurality of cores, the method comprising:
   receiving at least one first task, from an application, to run on a first core among the plurality of cores, wherein the at least one first task is bounded to the first core;
   determining a relative priority of the at least one first task running on the first core with at least one second task to run on at least one second core among the plurality of cores in the electronic device; and
   scheduling the at least one first task in the first core among the plurality of cores based on the relative priority, wherein the at least one first task configured for the relative priority is scheduled when the at least one second task has priority equal or less than the at least one first task configured for relativity.

2. The method of claim 1, wherein the relative priority corresponds to a special priority assigned to the at least one first task bounded to the first core, wherein the at least one first task bounded to the first core among the plurality of cores is configured to follow priority relation with the at least one second core among the plurality of cores in the electronic device.

3. The method of claim 1, wherein the first core is a bounded core and the at least one second core is a relative core.

4. The method of claim 1, wherein scheduling the at least one first task in the first core from the plurality of cores in the electronic device based on the relative priority comprises:
   determining movement of the at least one first task within a relative priority ready to run data structure (RBRTds) at the first core among a ready and blocked list of tasks based on a current running task (CRT) priority at the at least one second core;
   determining a force suspension for the CRT at the first core registered for Relative Bounded Multi-Processing (R-BMP);
   sending a signaling message to the first core for force suspension; and
   scheduling the at least one first task based on the signaling message.

5. The method of claim 4, wherein the first core performs the force suspension for the CRT, adds the CRT to the RBRTds, and schedules a next eligible task from a ready to run tasks data structure (BRTds), when the signaling message is sent to the first core for the force suspension.

6. The method of claim 1, wherein scheduling the at least one first task in the first core from the plurality of cores in the electronic device based on the relative priority comprises:
   determining movement of the at least one first task within a relative priority ready to run data structure (RBRTds) at the first core among a ready and blocked list of tasks based on a current running task (CRT) priority at the at least one second core;
   determining for pre-emption of the CRT at the first core registered for relative bounded multi-processing (R-BMP);
   sending a signaling message to the first core for a force pre-emption; and
   scheduling the at least one first task based on the signaling message.

7. The method of claim 6, wherein a top priority task preempts the CRT upon reception of a Relative Scheduling Cross Core Signaling (RSCCS) for a forced preemption on the first core, wherein the first core schedules the top priority task from the RBRTds when the signaling message is sent to the first core for the force pre-emption.

8. The method of claim 1, further comprising segregating relative tasks into ready to run and blocked sections.

9. The method of claim 8, wherein the blocked sections contain relative tasks not eligible to run on a bounded core due to relative priority.

10. An electronic device including a plurality of cores, the electronic device comprising:
    a memory;
    a processor, coupled with the memory and configured to:
       receive at least one first task, from an application, to run on a first core among the plurality of cores, wherein the at least one first task is bounded to the first core;

determine a relative priority of the at least one first task running on the first core with at least one second task to run on at least one second core among the plurality of cores in the electronic device; and schedule the at least one first task in the first core among the plurality of cores based on the relative priority, wherein the at least one first task configured for the relative priority is scheduled when the at least one second task has priority equal or less than the at least one first task configured for relativity.

11. The electronic device of claim 10, wherein the relative priority corresponds to a special priority assigned to the at least one first task bounded to the first core, wherein the at least one first task bounded to the first core among the plurality of cores is configured to follow priority relation with the at least one second core among the plurality of cores in the electronic device.

12. The electronic device of claim 10, wherein the first core is a bounded core and the at least one second core is a relative core.

13. The electronic device of claim 10, wherein to schedule the at least one first task in the first core from the plurality of cores in the electronic device based on the relative priority, the processor is configured to:

determine movement of the at least one first task within a relative priority ready to run data structure (RBRTds) at the first core among a ready and blocked list of tasks based on a current running task (CRT) priority at the at least one second core;

determine a force suspension for the CRT at the first core registered for Relative Bounded Multi-Processing (R-BMP);

send a signaling message to the first core for force suspension; and schedule the at least one first task based on the signaling message.

14. The electronic device of claim 13, wherein the first core performs the force suspension the CRT, adds the CRT to the RBRTds, and schedules a next eligible task from a ready to run tasks data structure (BRTds), when the signaling message is sent to the first core for the force suspension.

15. The electronic device of claim 10, wherein to schedule the at least one first task based on the relative priority in the first core from the plurality of cores in the electronic device, the processor is configured to:

determine movement of the at least one first task within a relative priority ready to run data structure (RBRTds) at the first core among a ready and blocked list of tasks based on a current running task (CRT) priority at the at least one second core;

determine for pre-emption of the CRT at the first core registered for Relative Bounded Multi-Processing (R-BMP);

send a signaling message to the first core for a force pre-emption; and schedule the at least one first task based on the signaling message.

16. The electronic device of claim 15, wherein a top priority task preempts the CRT upon reception of a Relative Scheduling Cross Core Signaling (RSCCS) for a forced preemption on the first core, wherein the first core schedules the top priority task from the RBRTds, when the signaling message is sent to the first core for the force pre-emption.

17. The electronic device of claim 10, wherein the processor is configured to segregate relative tasks into ready to run and blocked sections.

18. The electronic device of claim 17, wherein the blocked sections contain relative tasks not eligible to run on a bounded core due to relative priority.

* * * * *